(12) United States Patent
Yamashita (10) Patent No.: US 11,864,117 B2
(45) Date of Patent: Jan. 2, 2024

(54) PROGRAM AND ELECTRONIC DEVICE

(71) Applicant: NIKON CORPORATION, Tokyo (JP)

(72) Inventor: Naotaka Yamashita, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 17/412,975

(22) Filed: Aug. 26, 2021

(65) Prior Publication Data

US 2021/0410072 A1 Dec. 30, 2021

Related U.S. Application Data

(63) Continuation of application No. 16/757,454, filed as application No. PCT/JP2018/041056 on Nov. 5, 2018, now Pat. No. 11,147,020.

(30) Foreign Application Priority Data

Nov. 6, 2017 (JP) ................. 2017-214074

(51) Int. Cl.
   *G06Q 20/34* (2012.01)
   *G06Q 20/40* (2012.01)
   (Continued)

(52) U.S. Cl.
   CPC ....... *H04W 52/0261* (2013.01); *H04W 4/026* (2013.01); *H04W 4/029* (2018.02);
   (Continued)

(58) Field of Classification Search
   None
   See application file for complete search history.

(56) References Cited

U.S. PATENT DOCUMENTS

2001/0055373 A1* 12/2001 Yamashita ............. G01C 21/26
                                                                 379/90.01
2004/0158650 A1   8/2004 Nakamura et al.
(Continued)

FOREIGN PATENT DOCUMENTS

JP    2008-54119 A    3/2008
JP    2008-252212 A   10/2008
(Continued)

OTHER PUBLICATIONS

Dec. 11, 2018 International Search Report issued in International Patent Application No. PCT/JP2018/041056.
(Continued)

*Primary Examiner* — Gary Lafontant
(74) *Attorney, Agent, or Firm* — Oliff PLC (57) ABSTRACT

An electronic device including a generation unit, a reception unit, a storage unit, and a control unit. The generation unit generates data. The reception unit receives, from an external device, position information related to a position. The storage unit stores the received position information. The control unit determines an elapsed length of time that has passed since the reception unit received the position information. In response to the elapsed length of time being less than a predetermined length of time, the control unit correlates the generated data with the stored position information. In response to the elapsed length of time being greater than or equal to the predetermined length of time, the control unit transmits a request, to the external device, to transmit updated position information, and correlates the generated data with the updated position information.

17 Claims, 6 Drawing Sheets

(51) Int. Cl.
  *H04W 52/02* (2009.01)
  *H04W 4/029* (2018.01)
  *H04W 4/02* (2018.01)

(52) U.S. Cl.
  CPC ... *H04W 52/0229* (2013.01); *H04W 52/0235* (2013.01); *H04W 52/0245* (2013.01)

(56) References Cited

U.S. PATENT DOCUMENTS

| | | |
|---|---|---|
| 2008/0051102 A1 | 2/2008 | Matsubara |
| 2008/0242223 A1 | 10/2008 | Yamada |
| 2014/0258111 A1* | 9/2014 | Yoshikawa ........ G06Q 20/0652 705/41 |
| 2015/0347853 A1 | 12/2015 | Hwang |
| 2016/0095064 A1 | 3/2016 | Li et al. |

FOREIGN PATENT DOCUMENTS

| | | |
|---|---|---|
| JP | 2009-27647 A | 2/2009 |
| JP | 2017-034390 A | 2/2017 |
| JP | 2019-068364 A | 4/2019 |

OTHER PUBLICATIONS

Nov. 4, 2020 Office Action issued in Chinese Patent Application No. 201880085000.2.

Jun. 10, 2021 Notice of Allowance issued in U.S. Appl. No. 16/757,454.

Jun. 25, 2021 Corrected Notice of Allowability in U.S. Appl. No. 16/757,454.

Nov. 22, 2022 Office Action issued in Japanese Patent Application No. 2019-550518.

* cited by examiner

PROGRAM AND ELECTRONIC DEVICE

CROSS-REFERENCE TO RELATED APPLICATIONS

This is a Continuation of U.S. application Ser. No. 16/757,454 filed Apr. 20, 2020 (now U.S. Pat. No. 11,147,020), which is a § 371 National Stage entry of international application PCT/JP2018/041056 filed on Nov. 5, 2018, which claims the benefit of Japanese Priority Application No. 2017-214074 filed Nov. 6, 2017. The disclosure of each of the prior applications is hereby incorporated by reference herein in its entirety.

TECHNICAL FIELD

The present invention relates to a program and an electronic device.

BACKGROUND ART

There is an information communication system known in the related art (PTL 1) that enables communication of position information (position data) between a camera and a portable telephone. The information communication system in the related art does not assure full fine control implemented in correspondence to the state of the device.

CITATION LIST

Patent Literature

PTL1: Japanese Laid Open Patent Publication No. 2008-252212

SUMMARY OF INVENTION

According to a first aspect, a program causes a processor to execute: acquisition processing through which information related to a position is obtained; first transmission processing through which a signal that causes an external device in a first state to shift into a second state is transmitted; and second transmission processing through which, after the first transmission processing, the information obtained through the acquisition processing is transmitted to the external device.

According to a second aspect, an electronic device, comprises: an acquisition unit that obtains information related to a position; and a transmission unit that transmits the information obtained by the acquisition unit after transmitting a signal that causes an external device in a first state to shift into a second state.

According to a third aspect, an electronic device, comprises: a generation unit that generates data; a reception unit that receives, from an external device, information related to a position; and a control unit that correlates the data generated by the generation unit with the information related to a position received by the reception unit after generation of the data by the generation unit.

According to a fourth aspect, an electronic device having a generation unit that generates data, comprises: a reception unit that receives, from an external device, information related to a position; a storage unit in which the information related to a position received by the reception unit is stored; and a control unit that correlates the data generated by the generation unit with the information related to a position stored in the storage unit, wherein: if the information related to a position stored in the storage unit was received by the reception unit prior to a time point at which power to the electronic device has been turned on most recently, the control unit does not correlate the data generated by the generation unit with the information related to a position stored in the storage unit.

According to a fifth aspect, an electronic device comprises: a generation unit that generates data; a reception unit that receives, from an external device, information related to a position; a storage unit in which the information related to a position received by the reception unit is stored; and a control unit that correlates the data generated by the generation unit with the information related to a position stored in the storage unit, wherein: if a predetermined length of time has elapsed since a time point at which the information related to a position stored in the storage unit was received by the reception unit, the control unit does not correlate the data generated by the generation unit with the information related to a position stored in the storage unit.

DESCRIPTION OF EMBODIMENTS

First Embodiment

Figure 1:
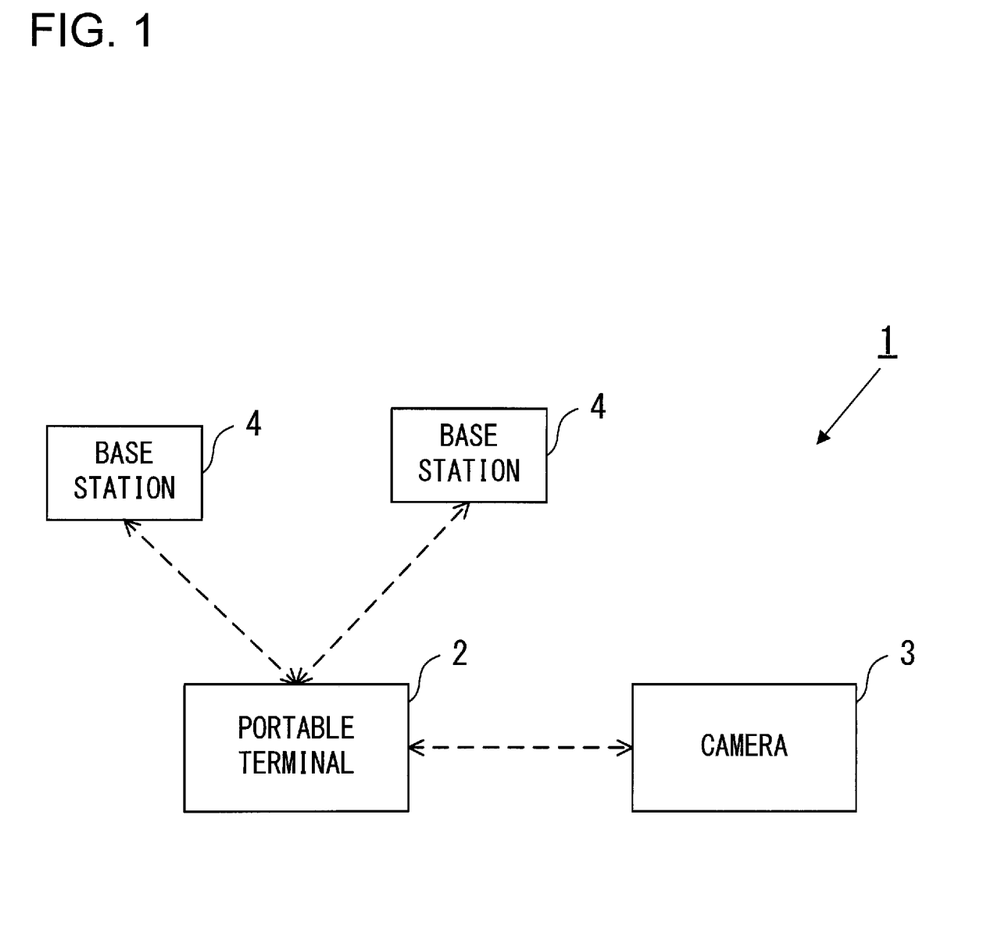
FIG. 1 A block diagram presenting an example of an overall configuration of an information communication system in a first embodiment FIG. 2 A block diagram presenting an example of a structure of a portable terminal in the first embodiment FIG. 3 A block diagram presenting an example of a structure of a camera in the first embodiment FIG. 4 A flowchart of an example of an operation at the portable terminal in the first embodiment FIG. 5 A flowchart of an example of an operation at the portable terminal and the camera in a second embodiment FIG. 6 A flowchart of an example of an operation at the portable terminal and the camera in a third embodiment

FIG. 1 is a diagram presenting an example of an overall configuration of an information communication system 1 achieved in the first embodiment. The information communication system 1 includes a portable terminal 2 and an electronic camera (digital camera) 3. The portable terminal 2 is an electronic device such as a smart phone, and assumes a structure that enables it to communicate with a plurality of base stations 4 in the vicinity. The portable terminal 2 and the electronic camera 3 (hereafter referred to as the camera 3) are structured so as to be able to engage in wireless communication with each other. A base station 4 may be a base station in a portable telephone network or it may be an access point of a wireless LAN.

As will be explained later, the portable terminal 2 in the embodiment obtains position information pertaining to the position of the portable terminal 2. The camera 3 obtains the position information from the portable terminal 2 through wireless communication. The camera 3 stores the position information obtained from the portable terminal 2 as information indicating a photographing position (location) in correspondence to image data generated through a photographing operation.

It is to be noted that the portable terminal 2 may be an electronic device other than a smart phone, such as a tablet terminal, a notebook-type personal computer or a wearable computer. In addition, the camera 3 may be an electronic device with a built-in camera, such as a tablet terminal, a notebook-type personal computer, a smart phone or a wearable computer. The camera 3 may be an electronic device that does not include a sensor for position detection or it may be an electronic device equipped with a position detection sensor capable of detecting a position with lower accuracy than the position detection accuracy of the electronic device in tandem with which it operates.

It is to be noted that the system in the embodiment is designed on the premise that one-on-one communication is enabled for the portable terminal 2 and the camera 3 so that they are able to exchange position information and the like with each other.

Figure 2:
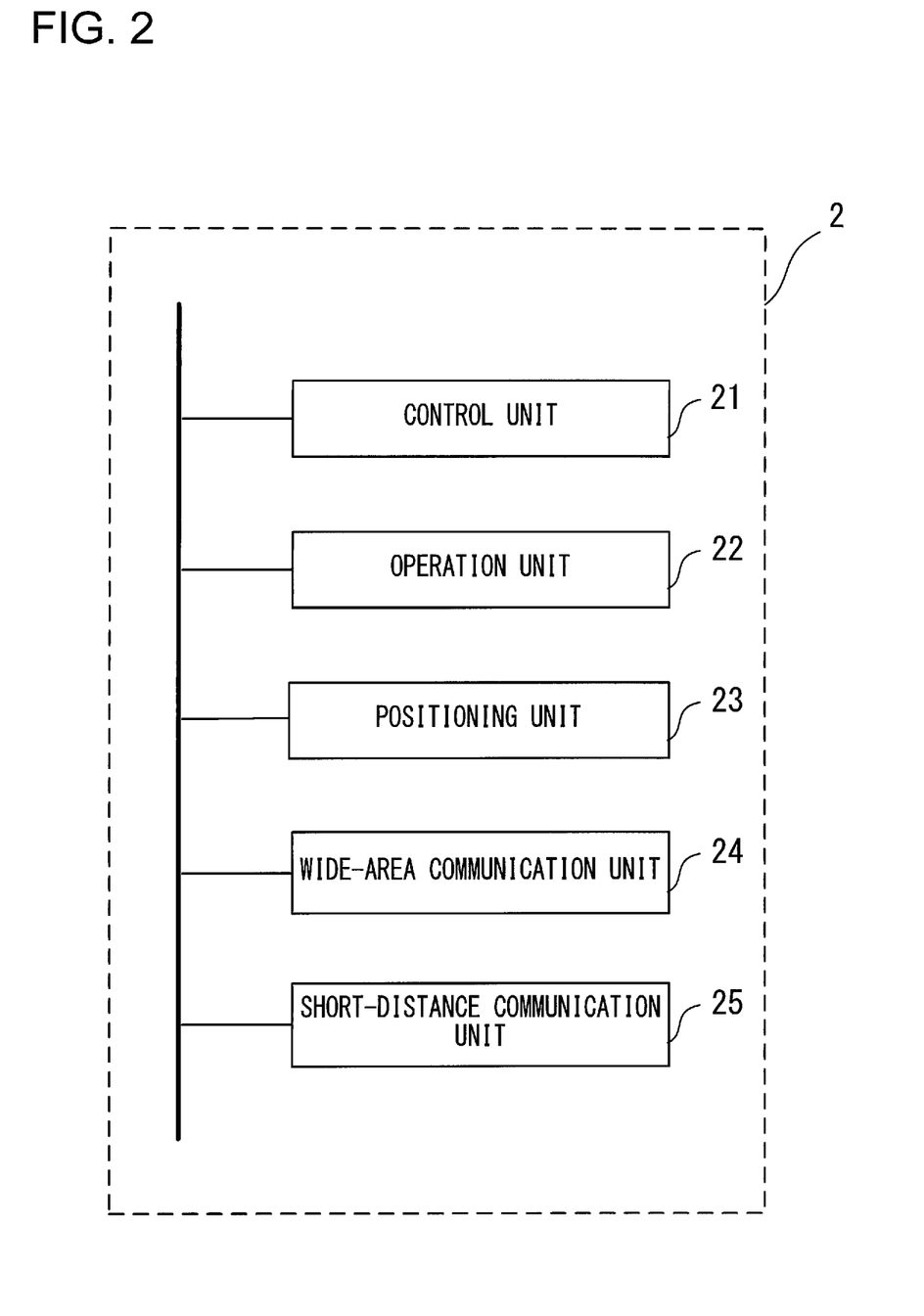

FIG. 2 is a block diagram presenting an example of a structure of the portable terminal 2 in the first embodiment. The portable terminal 2 includes a control unit 21, an operation unit 22, a positioning unit 23, a wide-area communication unit 24 and a short-distance communication unit 25. The control unit 21, the operation unit 22, the positioning unit 23, the wide-area communication unit 24 and the short-distance communication unit 25 are connected with one another via a bus.

The control unit 21 is configured with a processor such as a CPU or an FPGA and a memory such as ROM and RAM. The control unit 21 reads out a control program stored in the ROM and executes the program. The control program may be, for instance, an operating system for, for instance, the Android (registered trademark) or the iOS (registered trademark). The control program 21 executes the control program using the RAM as its work area so as to control the various units of the portable terminal 2.

A user operation performed on the portable terminal 2 is accepted via the operation unit 22. The operation unit 22 may be, for instance, a display unit with a touch panel via which operations performed with the user's finger, a stylus or the like are accepted. The display unit included in the operation unit 22 may be a liquid crystal display unit, an organic EL display unit or the like. The operation unit 22 detects an operation performed with the user's finger or the like and outputs a signal corresponding to the particular operation to the control unit 21. Based upon the signal provided by the operation unit 22, the control unit 21 sets an operating mode for the portable terminal 2, as will be explained later. It is to be noted that the operation unit 22 may be configured with a physical button or a selector switch in the hardware.

The positioning unit 23 is constituted with a sensor that detects the position of the portable terminal 2. The positioning unit 23 determines the current position of the portable terminal 2 by using, for instance, a satellite positioning system such as the GPS, the GLONASS or the QZSS, a wireless LAN, or the like. More specifically, the positioning unit 23 obtains position information pertaining to the position of the portable terminal 2 by receiving GPS signals transmitted from GPS satellites, for instance, and executing an arithmetic operation based upon the GPS signals. The position information may be information indicating a latitude and a longitude or information indicating a geographical location name. It is to be noted that the positioning unit 23 may generate position information by using information pertaining to a base station in the portable telephone network to which the portable terminal 2 is connected, or an access point in the wireless LAN to which the portable terminal 2 is connected. As an alternative, the positioning unit 23 may transmit GPS signals, information indicating a base station in the portable telephone network or an access point in the wireless LAN, or the like to a server connected to the network and then receive position information generated by the server.

The wide-area communication unit 24 detects a base station 4 in the vicinity of the portable terminal 2 and connects the portable terminal 2 to the portable telephone network via the base station 4. The wide-area communication unit 24 engages in information transmission/reception, such as a voice call, with another terminal via the portable telephone network.

The short-distance communication unit 25, constituted with a communication module or the like, engages in information transmission/reception to/from the camera 3 in compliance with communication standards such as Bluetooth (registered trademark) 4.0 (hereafter referred to as the BLE (Bluetooth Low Energy)). In addition, the short-distance communication unit 25 transmits position information obtained via the positioning unit 23 to the camera 3 as will be explained later. It is to be noted that the short-distance communication unit 25 may be a wireless LAN. In such a case, a camera communication unit 34 in the camera 3 will function as a wireless LAN access point. Furthermore, the communication carried out between the camera 3 and the portable terminal 2 is not limited to direct communication. As long as information can be transmitted/received between the portable terminal 2 and the camera 3, they may engage in communication via, for instance, the Internet, and there are no limitations whatsoever imposed with respect to the network mode or the communication protocol.

Figure 3:
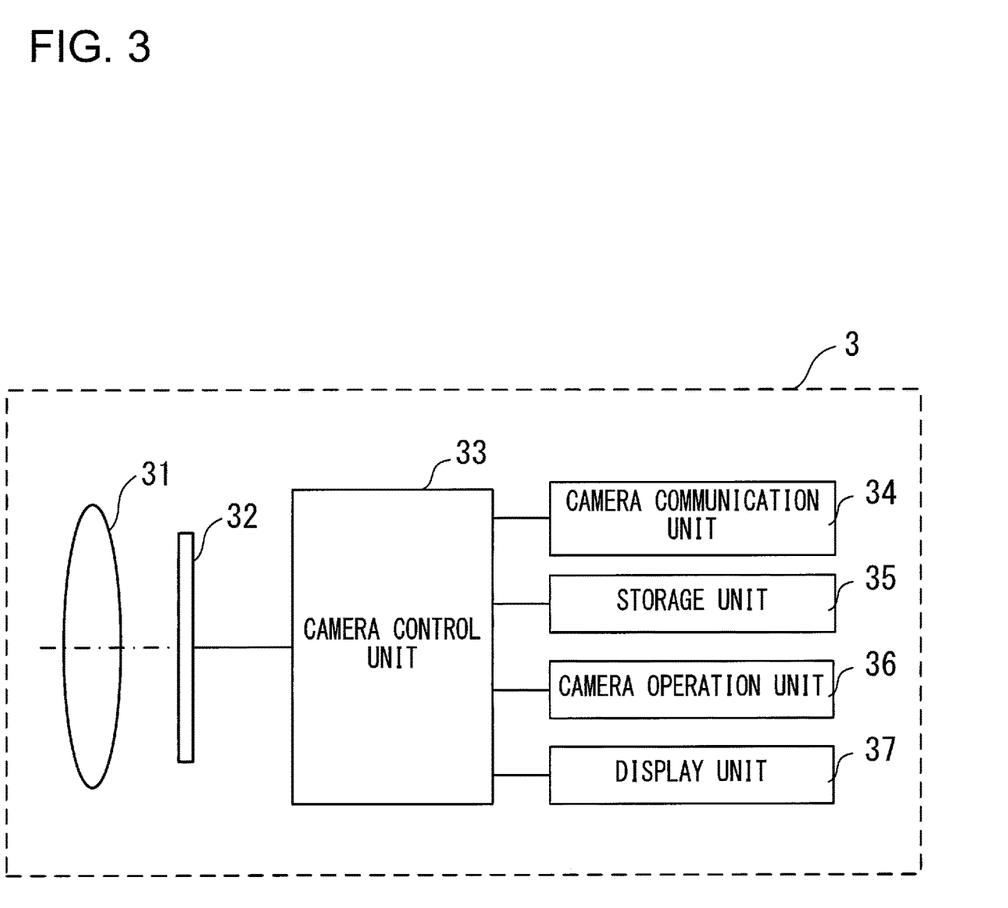

FIG. 3 is a block diagram presenting an example of a structure of the camera 3 in the first embodiment. The camera 3 includes an image-capturing optical system (photographic optical system) 31, an image sensor 32, a camera control unit 33, the camera communication unit 34, a storage unit 35, a camera operation unit 36 and a display unit 37.

While the image-capturing optical system 31 is represented by a single lens so as to simplify the illustration, it actually comprises a plurality of lenses, including a focus lens (focus adjustment lens) and forms a subject image on an image-capturing surface of the image sensor 32. The image sensor 32 may be, for instance, a CMOS image sensor or a CCD image sensor. The image sensor 32 receives a light flux that has passed through the image-capturing optical system 31 and captures a subject image. The image sensor 32 generates signals through photoelectric conversion of the light received therein and outputs the signals thus generated to the camera control unit 33.

The camera control unit 33 is configured with a processor such as a CPU or an FPGA and memory such as ROM and RAM. The camera control unit 33 controls the various units constituting the camera 3 by executing a control program read from the ROM where it is stored. The camera control unit 33 generates image data by executing image processing on the signals output from the image sensor 32. The camera control unit 33 also functions as an image data generation unit, and it generates still image data and video image data based upon signals output from the image sensor 3.

The camera communication unit 34, constituted with, for instance, a communication module, is engaged in information transmission/reception to/from the short-distance communication unit 25 at the portable terminal 2 in compliance with communication standards such as the BLE. The camera communication unit 34 receives position information obtained by the positioning unit 23 at the portable terminal 2 from the short-distance communication unit 25.

In the storage unit 35, which is a storage medium such as a memory card, image data generated by the camera control unit 33, and the like are stored (recorded). Data are written into the storage unit 35 and read out from the storage unit 35 under control executed by the camera control unit 33. Position information is attached by the camera control unit 33 to image data stored in the storage unit 35. In other words, information that includes image data and position information is stored into the storage unit 35. The information that includes the image data and the position information may be stored into the storage unit 35 as an image file. In such a case, the position information may be stored in a header portion of the image file and the image data may be stored in a payload portion (data portion) of the image file. As an alternative, the position information may be stored as EXIF information related to the image file.

It is to be noted that such image data may be either still image data or video image data. For image data expressing a video, the camera control unit 33 may include in the image data, position information indicating the position at the video shooting start time point, position information indicating the position acquired at the video shooting end time point or position information acquired at any time point during the shooting operation.

The camera operation unit 36, which includes various types of setting switches and the like, such as a shutter release switch and a power switch, outputs a signal corresponding to a specific operation to the camera control unit 33. At the display unit 37, a live view image, an image reproduced based upon image data stored in the storage unit 35, a menu screen and the like are brought up on display.

Position Information Acquisition Processing at the Portable Terminal

Position information acquisition processing executed at the portable terminal 2 will be described. Once power is turned on at the portable terminal 2, the positioning unit 23 executes an initial positioning operation with predetermined timing and obtains position information pertaining to the portable terminal 2. Subsequently, the control unit 21 monitors movement of the portable terminal 2 so as to detect whether or not the portable terminal 2 has moved by a distance equal to or greater than a predetermined distance (hereafter will be referred to as a positioning interval) from the position detected through the initial positioning operation.

The control unit 21 may detect the distance over which the portable terminal 2 has moved from the position detected in the initial positioning operation through, for instance, a triangulation method of the known art based upon the positions of a plurality of base stations 4 detected by the wide-area communication unit 24 and the lengths of time that elapse before wireless signals from the base stations 4 reach the portable terminal 2. Upon detecting that the portable terminal 2 has moved over a distance equal to or greater than the positioning interval (predetermined distance), the positioning unit 23 executes another positioning operation and updates the position information for the portable terminal 2 with the latest information. The current position ascertained by the portable terminal 2 based upon the position information is bound to contain an error equivalent to, at the most, the positioning interval (predetermined distance) in addition to the positioning error attributable to the positioning operation executed by the positioning unit 23. Accordingly, a shorter positioning interval will allow the portable terminal 2 to ascertain the current position with higher precision (accuracy). It is to be noted that provided that the distance between the position detected through the initial positioning operation and the current position can be detected, the portable terminal 2 may execute another positioning operation upon detecting that the current position is set apart by a distance equal to or greater than the positioning interval (predetermined distance) instead of detecting that it has moved by a distance equal to or greater than the positioning interval (predetermined distance). It is to be also noted that the distance over which the portable terminal 2 has moved may be determined by executing a plurality of time-integration operations on acceleration information detected via an acceleration detection unit (not shown) instead of through the method implemented in conjunction with a plurality of base stations 4 as explained above.

It is to be noted that the positioning interval constituting the requirement for the execution of another positioning operation does not need to be distance information and that time information may instead be used as the positioning interval. When the positioning interval is represented by time information, a new positioning operation will be executed once a predetermined length of time elapses following the preceding positioning operation.

Operating Mode at the Portable Terminal

The operating mode at the portable terminal 2 will be explained. The portable terminal 2 is able to assume two operating modes, i.e., a first mode and a second mode. The portable terminal 2 allows the user to set an operating mode for the portable terminal 2 by, for instance, performing an operation at a setting screen on display at the operation unit 22. In addition, the user is able to switch back and forth between the first mode and the second mode at the portable terminal 2 by performing an operation at a setting screen on display at the operation unit 22.

The first mode is a high-precision mode. In the high-precision mode, a shorter positioning interval, compared to that in the second mode, is set. As a result, the positioning unit 23 is bound to be engaged in positioning operation more frequently, assuring higher precision (more accurate) position information to be held at the portable terminal 2. At the same time, since the positioning unit 23 is engaged in frequent positioning operations, the power consumption at the portable terminal 2 will be relatively high.

The second mode is a power-saving mode. In the power-saving mode, a longer positioning interval, compared to that in the first mode (high-precision mode), is set. As a result, since the positioning unit 23 is engaged in fewer (less frequent) positioning operations, the position information held at the portable terminal 2 will be less precise. In this sense, the second mode may be referred to as a low-precision mode. At the same time, since the positioning unit 23 is engaged in a smaller number of positioning operations compared to the number of operations executed in the high-precision mode, the power consumption at the portable terminal 2 will be relatively low.

Accordingly, the first mode may be referred to as a mode requiring greater power consumption compared to the second mode. It is to be noted that the second mode may be referred to as a low-precision mode with respect to the positioning accuracy, as opposed to the first mode, i.e., the high-precision mode. Furthermore, the first mode may be referred to as a high-power consumption (power inefficient) mode with respect to the amount of power that requires, as opposed to the second mode, i.e., the power-saving mode.

The use of the position information transmitted from the portable terminal 2 to the camera 3 will be explained next. The short-distance communication unit 25 at the portable terminal 2 transmits the position information obtained by the positioning unit 23 to the camera communication unit 34 of the camera 3 with timing that will be explained later. The camera control unit 33 stores the position information most recently received at the camera communication unit 34 from the short-distance communication unit 25, i.e., the latest position information, into, for instance, a built-in memory in the camera control unit 33. As the user presses down the shutter release switch at the camera operation unit 36, the camera control unit 33 generates image data of a subject image and stores the image data, together with the latest position information stored in the memory and attached to the image data by the camera control unit 33, into the storage unit 35. In other words, the position information indicating the photographing position is stored together with the image data into the storage unit 35. The position information may be attached to the image data by, for instance, generating an image file that contains both the image data and the position information. In such a case, the position information may be stored in a header portion of the image file and the image data may be stored in a payload portion (data portion) of the image file. As an alternative, the position information may be stored as EXIF information related to the image file.

State of the Camera

States of the camera 3 will be explained. The camera 3 assumes a first state and a second state with respect to the amount of power consumed in the camera 3. The user is able to switch the camera 3 to the first state or to the second state by operating, for instance, the camera operation unit 36.

In the first state, execution of various operations, including a photographing operation is enabled, (hereafter referred to as an active state). When the camera 3 is in the active state, communication between the camera communication unit 34 of the camera 3 and the short-distance communication unit 25 at the portable terminal 2 is established via BLE, for instance. Namely, the camera 3 in the active state is able to receive, via the camera communication unit 34, position information from the portable terminal 2. In addition, while the camera 3 is in the active state, the camera communication unit 34 waits in standby to receive position information and the display unit 37 brings up on display a live view image. This means that more power is consumed when the camera 3 is in the first state, compared to the power consumed when the camera 3 is in the second state, to be described below.

In the second state, execution of various operations such as a photographing operation is not enabled (hereafter will be referred to as a sleep state). The camera 3 enters the sleep state when the sleep state is selected through an operation performed at the camera operation unit 36 or when the user has not performed an operation over a predetermined length of time. When the camera 3 is in the sleep state, the camera communication unit 34 does not wait in standby to receive position information or the display unit 37 does not display a live view image, resulting in less power being consumed compared to that consumed in the first state. In addition, when the camera 3 is in the sleep state, communication with the portable terminal 2 is not established and thus, position information from the portable terminal 2 cannot be received by the camera communication unit 34.

Regardless of whether the camera 3 is in the active state or in the sleep state, the camera 3 transmits a signal indicating its state (state information) to the portable terminal 2. For instance, the camera communication unit 34 of the camera 3 may, for instance, attach state information indicating the state of the camera 3 to a BLE advertising packet and transmit the advertising packet on a regular basis. The advertising packet may be transmitted through, for instance, broadcasting, and in such a case, a terminal located nearby will receive the advertising packet and thus obtain the state information pertaining to the camera 3. The control unit 21 at the portable terminal 2 will be able to ascertain the state of the camera 3, i.e., whether it is in the active state or in the sleep state, by obtaining the state information pertaining to the camera 3 in the advertising packet received via the short-distance communication unit 25. In other words, the control unit 21 constitutes a detection unit that detects the state of the camera 3 based upon the state information received from the camera 3.

The portable terminal 2 is capable of transmitting a signal (hereafter referred to as an activation signal), which switches (shifts) the camera 3 in the sleep state to the active state, to the camera 3. For instance, the short-distance communication unit 25 may transmit an activation signal requesting establishment of BLE communication to the camera communication unit 34. In response to the activation signal received thereat, the camera communication unit 34 will establish BLE communication with the short-distance communication unit 25. The camera 3 will shift from the sleep state to the active state based upon the activation signal and also establish BLE communication with the portable terminal 2. Once the camera 3 has shifted into the active state, it will be able to receive position information from the portable terminal 2.

Transmission Timing with which Position Information is Transmitted

The timing with which position information is transmitted will be explained next. The portable terminal 2, having executed a positioning operation and updated the position information, checks the state of the camera 3. The state of the camera 3 can be ascertained based upon, for instance, an advertising packet received from the camera 3. If the camera 3 is in the active state, the portable terminal 2 promptly transmits the latest position information to the camera 3. If, on the other hand, the camera 3 is in the sleep state, it adjusts the position information transmission timing in correspondence to the operating mode currently set at the portable terminal 2.

If the camera 3 is in the sleep state and the operating mode selected at the portable terminal 2 is the high-precision mode, the portable terminal 2 transmits an activation signal to the camera 3 and then transmits the position information to the camera 3 only after the camera 3 is switched to the active state. This operational sequence is followed since the camera 3 cannot receive any position information if it is in the sleep state.

However, if the operating mode selected at the portable terminal 2 is the power-saving mode, the portable terminal 2 does not transmit the position information immediately. The portable terminal 2 instead waits for the camera 3 to enter the active state in response to, for instance, a user operation. Upon detecting that the camera 3 has entered the active state, the portable terminal 2 transmits the latest position information to the camera 3.

As described above, the portable terminal 2 in the embodiment controls the timing with which a signal (an activation signal or position information) is transmitted from the portable terminal 2 to the camera 3 in correspondence to the combination of the operating mode selected at the portable terminal 2 and the state of the camera 3.

Latest Position Information

As has been explained earlier, the camera control unit 33 holds the position information most recently received from the portable terminal 2, i.e., the latest position information corresponding to the time point at which the camera has been engaged in a photographing operation, stored in, for instance, the built-in memory of the camera control unit 33. Then, as the user presses down the shutter release switch at the camera operation unit 36, the camera control unit 33 creates image data of a subject image, attaches the latest position information stored in the memory to the image data and stores the image data into the storage unit 35.

The camera 3 is able to obtain the latest position information in situations (1) through (3) below.

(1) When the camera 3 is in the active state, the portable terminal 2 promptly transmits the latest position information upon executing a positioning operation and updating the position information and thus, as the shutter release switch is pressed down, the latest position information is attached to the image data.

(2) When the camera 3 is in the sleep state and the operating mode selected at the portable terminal 2 is the high-precision mode, the portable terminal 2 executes a positioning operation and updates the position information, transmits an activation signal to the camera 3, thereby switching the camera 3 to the active state, and finally transmits the position information to the camera 3. In this situation, too, the portable terminal 2 promptly transmits the latest position information once it has executed a positioning operation and updates the position information, and thus, as the shutter release switch is pressed down, the latest position information is attached to the image data.

(3) When the camera 3 is in the sleep state and the operating mode selected at the portable terminal 2 is the power-saving mode, the portable terminal 2 transmits the latest position information to the camera 3 upon detecting that the camera 3 has entered the active state after executing a positioning operation and updating the position information. As long as the camera 3 stays in the sleep state, the latest position information is not transmitted to the camera 3 even if the portable terminal 2 executes a positioning operation and updates the position information. This means that if the shutter release switch is pressed down simultaneously as the camera 3 is started up, for instance, image data of a subject image are generated and the position information already stored in the memory is attached to the image data before the latest position information is transmitted to the camera 3. It is to be noted that under similar circumstances, if the shutter release switch is pressed down after some time has elapsed since the camera 3 entered the active state, the portable terminal 2, having detected that the camera 3 entered the active state, will have transmitted the latest position information to the camera 3 and thus, the latest position information will be attached to the image data.

Operation at the Portable Terminal

Figure 4:
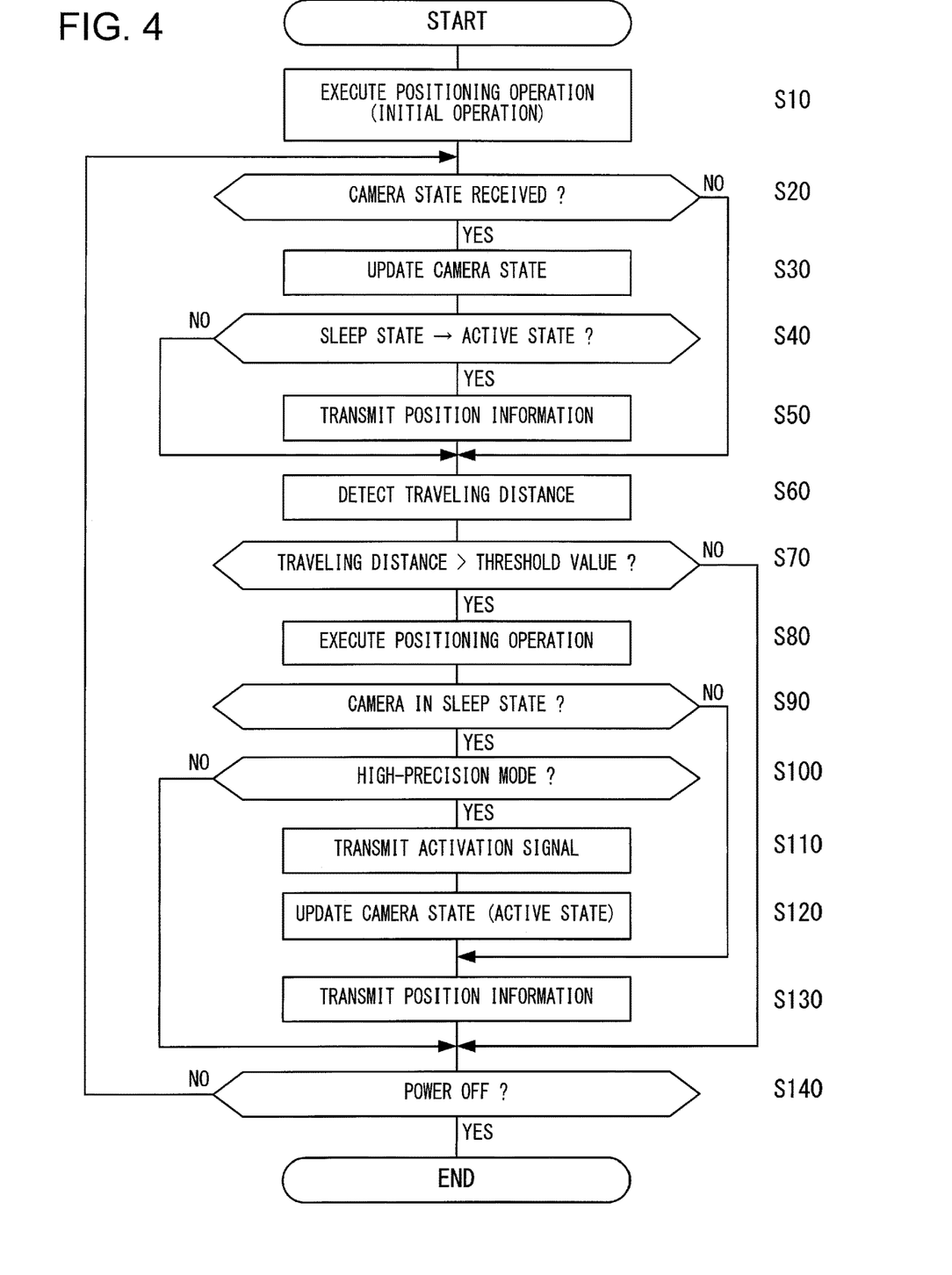

FIG. 4 presents a flowchart of an example of an operation at the portable terminal in the first embodiment. The operation in the flowchart in FIG. 4 starts based upon the control program stored in the portable terminal 2 after power is turned on at the portable terminal 2.

In step S10, the positioning unit 23 at the portable terminal 2 executes an initial positioning operation and obtains position information. The position information obtained by the positioning unit 23 is written into a specific address in a memory configuring the control unit 21.

In step S20, the short-distance communication unit 25 makes a decision as to whether or not state information (indicating either the active state or the sleep state) transmitted from the camera 3 has been received. If state information originating from the camera 3 has not been received, the processing proceeds to step S60. If, on the other hand, information indicating the state of the camera 3 has been received, the processing proceeds to step S30.

In step S30, the control unit 21 writes the state information from the camera 3, received by the short-distance communication unit 25, into a specific address in the memory so as to update the state of the camera 3 ascertained by the control unit 21.

In step S40, the control unit 21 makes a decision based upon the state information written therein in step S30 as to whether or not the camera 3 has been switched from the sleep state to the active state. In other words, the control unit 21 makes a decision with respect to a shift in the state of the camera 3. If the camera 3 has shifted from the sleep state to the active state, the processing proceeds to step S50. If, on the other hand, the camera 3 has not shifted from the sleep state to the active state, the processing proceeds to step S60.

In step S50, the short-distance communication unit 25 transmits the latest position information written in the memory at the control unit 21 to the camera 3. The processing then proceeds to step S60.

In step S60, the control unit 21 detects, based upon, for instance, position information pertaining to base stations 4 obtained via the wide-area communication unit 24, a traveling distance over which the portable terminal 2 has moved from the geographical point indicated in the latest position information written at the specific address in the memory.

In step S70, the control unit 21 makes a decision as to whether or not the traveling distance detected in step S60 exceeds a positioning interval (a threshold value) set in correspondence to the operating mode. If the traveling distance does not exceed the positioning interval, the processing proceeds to step S140. However, if the traveling distance exceeds the positioning interval, the processing proceeds to step S80.

The positioning interval, determined based upon the operating mode, is a traveling distance set in advance in correspondence to each of the operating modes, i.e., the first mode, which is the high-precision mode, and the second mode, which is the power-saving mode, and the predetermined threshold value is represented by this traveling distance.

In step S80, the positioning unit 23 executes a positioning operation and obtains latest position information with respect to the portable terminal 2. As this latest position information is written into the specific address in the memory of the control unit 21, the position information in the memory is updated.

In step S90, the control unit 21 makes a decision based upon the current state of the camera 3, i.e., based upon the state information written at the specific address in the memory, as to whether or not the camera 3 is in the sleep state. In other words, the control unit 21 makes a decision as to whether or not the camera 3 is currently in a position information reception disabled state. If the camera 3 is in the active state, the camera 3 is in a position information reception enabled state and accordingly, a negative decision is made in step S90. In this case, the processing proceeds to step S130, in which the short-distance communication unit 25 transmits the latest position information to the camera 3. If, on the other hand, the camera 3 is in the sleep state, the camera 3 is in a position information reception disabled state, an affirmative decision is made in step S90 and the processing proceeds to step S100.

In step S100, the control unit 21 makes a decision as to whether or not the operating mode selected at the portable terminal 2 is the high-precision mode. If the operating mode selected at the portable terminal 2 is the power-saving mode instead of the high-precision mode, the processing proceeds to step S140. However, if the current operating mode is the high-precision mode, the processing proceeds to step S110.

In step S110, the short-distance communication unit 25 transmits an activation signal to the camera 3. In response to this activation signal, the camera 3 shifts from the sleep state to the active state.

In step S120, the control unit 21 updates the state indicated in the state information written at the specific address in the memory from the sleep state to the active state. Subsequently, in step S130, the short-distance communication unit 25 transmits the latest position information to the camera 3.

In step S140, the control unit 21 makes a decision as to whether or not the user has entered an instruction for turning off power at the portable terminal 2. This decision may be made by, for instance, deciding whether or not the user has operated the power switch. If a power-off instruction has not been entered, the processing proceeds to step S20. If, on the other hand, a power-off instruction has been entered, the control unit 21 ends the processing in FIG. 4 and turns off power at the portable terminal 2.

The following advantages and operations are achieved through the embodiment described above.

(1) The short-distance communication unit 25 at the portable terminal 2 transmits position information obtained by the positioning unit 23 to the camera 3, i.e., an external device, which may be in the sleep state or in the active state, with timing determined based upon the operating mode currently set at the portable terminal 2 (the high-precision mode or the power-saving mode) and the current state of the camera (the active state or the sleep state). By adjusting the timing with which position information is transmitted in correspondence to the state of the camera 3 and the mode selected at the portable terminal 2 as described above, finer control can be executed in correspondence to the conditions at the camera 3 and the portable terminal 2.

(2) The program achieved in the embodiment is executed by a processor of an electronic device (portable terminal 2) that is set either to the first mode (high-precision mode) or to the second mode (power-saving mode). The program enables acquisition processing through which sensor information (position information) is obtained via a sensor (positioning unit 23) constituting part of the electronic device, first transmission processing through which, based upon the currently selected mode and the current state of an external device (camera 3) that is either in the first state (active state) or in the second state (sleep state), a signal in response to which the external device is switched from the second state to the first state is transmitted is transmitted to the external device and second transmission processing through which the information obtained via the sensor is transmitted to the external device. Thus, fine control can be executed in correspondence to the conditions at the external device (camera 3) and the electronic device (portable terminal 2).

(3) The sensor included in the electronic device may be, for instance, a positioning unit 23, and in such a case, the positioning unit 23 at the portable terminal 2 obtains position information with lower frequency in the power-saving mode in comparison to the frequency with which it obtains position information in the high-precision mode. Less power is consumed at the portable terminal 2 in the power-saving mode in comparison to the power consumed in the high-precision mode. With these two operating modes, control over prioritization of position information accuracy and power consumption at the portable terminal 2 is enabled.

(4) The external device may be, for instance, the camera 3, and when it is in the active state, more power is consumed at the camera 3 compared to the power consumed in the sleep state, an image is on display at the display unit 37 of the camera 3 and the camera communication unit 34 is in a position information reception enabled state. When the camera 3 is in the sleep state, no image is on display at the display unit 37 and the camera communication unit 34 is in a position information reception disabled state. Since the control unit 21 adjusts operation in correspondence to either of the two states assumed in the camera 3 as described above, finer control accommodating specific user needs can be executed.

(5) The electronic device may be the portable terminal 2, and when the high-precision mode is selected and the camera 3, i.e., the external device, is in the sleep state, the control unit 21 of the portable terminal 2 first transmits an activation signal to the camera 3 and subsequently transmits position information only after the camera 3 shifts to the active state. As a result, the camera 3 is able to obtain more accurate position information when the high-precision mode is selected at the portable terminal 2.

(6) The electronic device may be the portable terminal 2, and when the power-saving mode is selected at the portable terminal 2 and the camera 3, i.e., the external device, is in the sleep state, the control unit 21 of the portable terminal 2 transmits position information only after the camera 3 shifts into the active state. In other words, when the power-saving mode is selected, the portable terminal 2 transmits position information obtained through a positioning operation to the camera 3 after the camera 3 shifts into the active state, instead of immediately transmitting the position information to the camera 3, which makes it possible to reduce the amount of power consumed at the portable terminal 2. In addition, if positioning data are obtained at the portable terminal 2 while the camera is in the sleep state and the portable terminal 2 is in the power-saving mode, the portable terminal 2 does not transmit an activation signal to the camera 3 in the sleep state. Thus, the state of the camera 3 remains unchanged without switching to the active state since no activation signal is sent from the portable terminal 2, which makes it possible to minimize the power consumed at the camera 3.

Second Embodiment

An information communication system 1 achieved in the second embodiment of the present invention will be described. A portable terminal 2 and a camera 3 achieved in the second embodiment adopt structures substantially identical to those of the portable terminal 2 and the camera 3 in the first embodiment.

In the first embodiment described earlier, in response to a depression of the shutter release switch, the camera 3 generates image data by executing a photographing operation and correlates position information stored in, for instance, a built-in memory of the camera control unit 33 with the image data. The camera 3 in the second embodiment obtains position information from the portable terminal 2 following a photographing operation and sets the position information thus obtained in correlation with the image data. It is to be noted that parts of the operation identical to those in the operation executed in the first embodiment will not be described in the following explanation, which will instead focus on operational features different from those of the operation in the first embodiment.

In this embodiment, as the shutter release switch is pressed down, the camera 3 is engaged in a photographing operation and generates image data. In addition, the camera 3 transmits a signal (request signal) requesting transmission of position information to the portable terminal 2. Upon receiving the request signal, the portable terminal 2 transmits position information to the camera 3. The camera 3 correlates the position information transmitted from the portable terminal 2 with the image data generated through the photographing operation. The camera 3 attaches the position information obtained from the portable terminal 2 to the image data and stores them into the storage unit 35.

As described above, upon executing a photographing operation, the camera 3 in the embodiment transmits a request signal to the portable terminal 2 and receives position information from the portable terminal 2. As a result, the camera 3 is able to attach the latest position information to the image data. Regardless of the traveling distance over which the camera 3 has moved from the position at which power was last turned off to the position at which power has been turned back on, accurate position information can be attached to image data generated through a photographing operation even when, for instance, the shutter release switch is depressed immediately after power is turned on at the camera 3.

Figure 5:
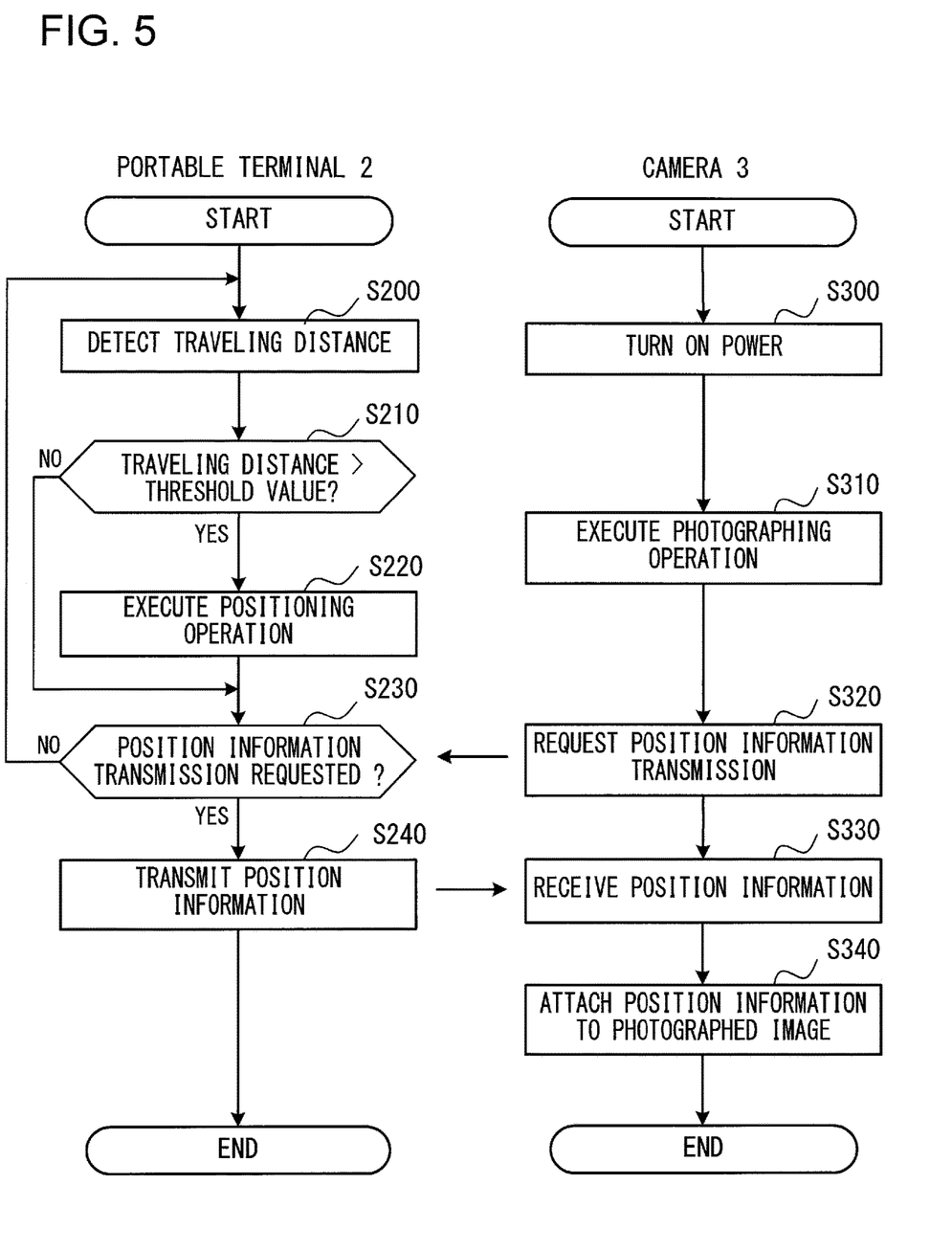

FIG. 5 presents a flowchart of an example of an operation at the portable terminal and the camera in the second embodiment. In reference to the flowchart in FIG. 5, the example of an operation executed at the portable terminal 2 and the camera 3 will be explained.

In step S200, the control unit 21 at the portable terminal 2 detects, based upon position information pertaining to base stations 4 obtained via the wide-area communication unit 24 or the like, a traveling distance over which the portable terminal 2 has moved from the geographical point indicated in the latest position information written at the specific address in the memory.

In step S210, the control unit 21 makes a decision as to whether or not the traveling distance detected in step S200, exceeds the positioning interval (a threshold value) set in correspondence to the operating mode. If the traveling distance does not exceed the positioning interval, the processing proceeds to step S230. However, if the traveling distance exceeds the positioning interval, the processing proceeds to step S220.

In step S220, the positioning unit 23 executes a positioning operation and obtains latest position information with respect to the portable terminal 2. As this latest position information is written at the specific address in the memory of the control unit 21, the position information in the memory is updated.

In step S300, power to the camera 3 is turned on. In response, the camera 3 shifts from a power-off state to a power-on state. In step S310, as the user presses down the shutter release switch at the camera operation unit 36, the camera control unit 33 creates image data of a subject image.

Following the photographing operation executed in step S310, the camera control unit 33 transmits, via the camera communication unit 34, a request signal requesting transmission of position information to the portable terminal 2 in step S320.

In step S230, the short-distance communication unit 25 at the portable terminal 2 makes a decision as to whether or not a request signal transmitted from the camera 3 has been received. If no request signal has been received from the camera 3, the processing proceeds to step S200. If, on the other hand, a request signal from the camera 3 has been received, the processing proceeds to step S240. In step S240, the short-distance communication unit 25 transmits the latest position information written in the memory of the control unit 21 to the camera 3.

In step S330, the camera communication unit 34 receives the latest position information from the portable terminal 2. In step S340, the camera control unit 33 attaches the latest position information obtained from the portable terminal 2 via the camera communication unit 34 to the image data generated through the photographing operation executed in step S310 and stores them into the storage unit 35.

The following advantage and operation are achieved through the embodiment described above.

(1) The camera control unit 33 in the camera 3 correlates image data generated through a photographing operation with position information received at the camera communication unit 34 following the image data generation. This means that position information can be attached to image data following a photographing operation. Even when a photographing operation is executed immediately after power to the camera 3 is turned on, accurate position information is attached to the image data generated through the photographing operation.

Third Embodiment

The following is a description of the third embodiment of the present invention. A portable terminal 2 and a camera 3 achieved in the third embodiment adopt structures substantially identical to those of the portable terminal 2 and the camera 3 in the first embodiment.

After executing a photographing operation, the camera 3 in the third embodiment makes a decision as to whether or not the position information stored in the built-in memory or the like of the camera control unit 33 is relatively new position information. For instance, the camera control unit 33 may decide that the position information stored in the memory is new position information if it has been received at the camera communication unit 34 during a time period following the time point at which power was turned on at the camera 3 and leading up to the time point at which the photographing operation was executed. In other words, position information obtained before power has been turned on most recently in relation to the photographing operation time point will not be determined to be new position information.

It is to be noted that the camera control unit 33 may compare the time point at which the position information stored in the memory was updated with the current time point and may decide that the position information stored in the memory is new position information if a predetermined length of time (e.g., several minutes to 10 minutes) has not elapsed.

If the position information stored in the memory is determined to be new position information, the camera control unit 33 correlates the position information stored in the memory with the generated image data. The camera control unit 33 attaches the position information stored in the memory to the image data and stores them together into the storage unit 35.

If, on the other hand, it is decided that the position information stored in the memory is not new position information, the camera 3 does not correlate the position information stored in the memory with the generated image data. In this situation, the camera 3 transmits a request signal requesting transmission of position information to the portable terminal 2. Upon receiving the request signal, the portable terminal 2 transmits position information to the camera 3 and the camera 3 stores the position information newly received from the portable terminal 2 into the memory. The camera 3 correlates the position information newly received from the portable terminal 2 with the generated image data. The camera control unit 33 attaches the position information newly obtained from the portable terminal 2 to the image data and stores them into the storage unit 35.

As described above, the camera 3 in the embodiment makes a decision as to whether or not the position information stored in the memory is new position information and changes the position information to be attached to the image data based upon the decision-making results. As a result, the camera 3 is able to attach accurate position information to the image data. Even if the shutter release switch is pressed down immediately after power is turned on at the camera 3, accurate position information can be attached to the image data.

Figure 6:
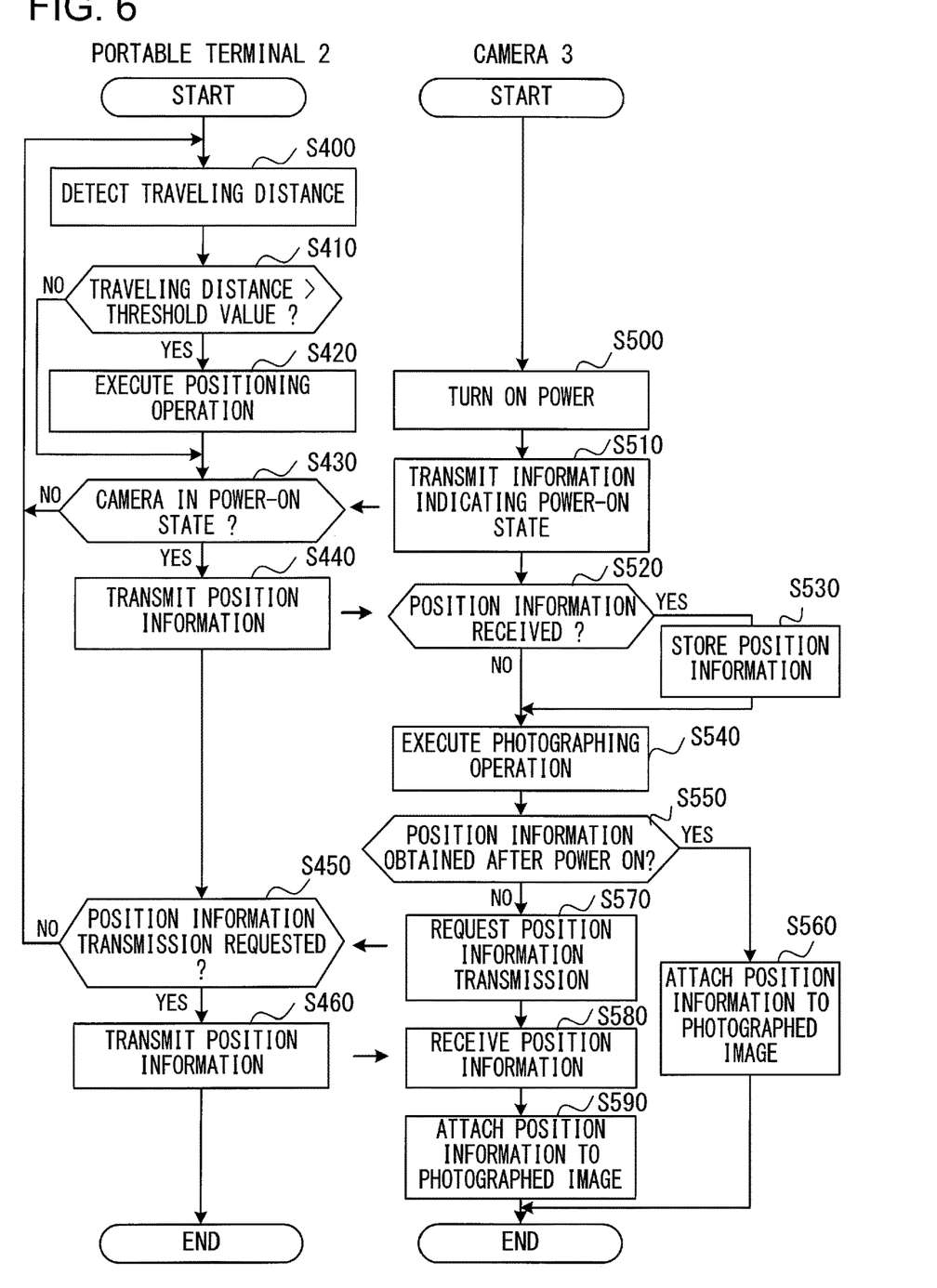

FIG. 6 presents a flowchart of an example of an operation at the portable terminal and the camera in the third embodiment. In reference to the flowchart in FIG. 6, the example of an operation executed at the portable terminal 2 and the camera 3 will be explained.

In step S400, the control unit 21 at the portable terminal 2 detects, based upon position information pertaining to base stations 4 obtained by the wide-area communication unit 24 or the like, a traveling distance over which the portable terminal 2 has moved from the geographical point indicated in the latest position information written at the specific address in the memory.

In step S410, the control unit 21 makes a decision as to whether or not the traveling distance detected in step S400 exceeds the positioning interval set in correspondence to the operating mode. If the traveling distance does not exceed the positioning interval, the processing proceeds to step S430. However, if the traveling distance exceeds the positioning interval, the processing proceeds to step S420.

In step S420, the positioning unit 23 executes a positioning operation and obtains latest position information with respect to the portable terminal 2. As this latest position information is written into the specific address in the memory of the control unit 21, the position information in the memory is updated.

In step S500, power to the camera 3 is turned on. In response, the camera 3 shifts from a power-off state to a power-on state. Once power is turned on at the camera 3, the camera control unit 33 of the camera 3 transmits state information indicating that the camera 3 is in a power-on state via the camera communication unit 34 in step S510.

In step S430, the control unit 21 at the portable terminal 2 makes a decision based upon the state information transmitted from the camera 3 as to whether or not the camera 3 is in a power-on state. If it is decided that the camera 3 is in a power-on state, the processing executed in the camera control unit 33 proceeds to step S440, whereas if a negative decision is made in step S430, the processing proceeds to step S400.

In step S440, the short-distance communication unit 25 transmits the latest position information written in the memory in the control unit 21 to the camera 3. It is to be noted that as in the first embodiment, the portable terminal 2 ascertains the state of the camera 3 based upon state information output from the camera 3 on a regular basis and transmits the position information to the camera 3 in correspondence to a specific combination of the operating mode selected at the portable terminal 2 and the state of the camera 3.

If the camera control unit 33 decides in step S520 that position information has been received from the portable terminal 2, the processing proceeds to step S530, whereas if no position information has been received from the portable terminal 2, the processing proceeds to step S540. In step S530, the camera control unit 33 stores the position information received from the portable terminal 2 into the memory.

In step S540, as the user presses down the shutter release switch at the camera operation unit 36, the camera control unit 33 creates image data expressing a subject image.

In step S550, the camera control unit 33 makes a decision as to whether or not the position information stored in the memory is position information obtained during a time period following the power on in step S500 and up to the current time point. If it is decided in step S550 that the position information stored in the memory is position information obtained during the time period following the power on in step S500 and leading up to the current time point, the camera control unit 33 decides that the position information stored in the memory is new position information. In other words, if position information has been transmitted from the portable terminal 2 to the camera 3 and the position information at the camera 3 has been updated during the time period elapsing between step S500 and step S550, the position information stored in the memory is determined to be new position information. If the camera control unit 33 decides that the position information stored in the memory is new position information, the processing proceeds to step S560, whereas if a negative decision is made in step S550, the processing proceeds to step S570.

In step S560, the camera control unit 33 stores the position information stored in the memory into the storage unit 35 by attaching it to the image data generated through the photographing operation in step S540.

In step S570, the camera control unit 33 transmits, via the camera communication unit 34, a request signal requesting transmission of position information to the portable terminal 2.

In step S450, the short-distance communication unit 25 makes a decision as to whether or not a request signal transmitted from the camera 3 has been received. If no request signal from the camera 3 has been received from the camera 3, the processing proceeds to step S400. If, on the other hand, a request signal from the camera 3 has been received, the processing proceeds to step S460. In step S460, the short-distance communication unit 25 transmits the latest position information written in the memory of the control unit 21 to the camera 3.

In step S580, the camera communication unit 34 receives the position information from the portable terminal 2. In step S590, the camera control unit 33 attaches the position information obtained from the portable terminal 2 to the image data generated through the photographing operation executed in step S540 and stores them together in the storage unit 35.

The following advantages and operations are achieved through the embodiment described above.

(1) If the position information stored in the memory has been received by the camera communication unit 34 before the time point at which power was turned on most recently, the camera control unit 33 does not correlate image data generated through a photographing operation with the position information stored in the memory. Thus, it is ensured that inaccurate position information is not attached to the image data resulting from a photographing operation.

(2) If the position information stored in the memory has been received by the camera communication unit 34 before the time point at which power was turned on most recently, the camera control unit 33 correlates position information newly received by the camera communication unit 34 with image data generated. This means that accurate position information can be attached to the image data resulting from a photographing operation.

The following variations are also within the scope of the present invention and one of the variations or a plurality of variations may be adopted in combination with any of the embodiments described above.

Variation 1

The traveling distance does not need to be detected through a triangulation method using the positions of base stations 4 or the like. For instance, the traveling distance may instead be detected by using an acceleration sensor or the like. The traveling distance may be determined, for instance, by executing multiple time-integration operations on acceleration information detected via the acceleration sensor.

Variation 2

The positioning timing may be determined through a method other than that whereby the traveling distance is compared with a threshold value. Provided that the positioning timing is represented by time information, a new positioning operation will be executed when a predetermined length of time has elapsed following the previous positioning operation. In such a case, positioning operations may be executed cyclically over relatively short time intervals (e.g., one minute intervals) in the high-precision mode and positioning operations may be executed cyclically over relatively long time intervals (e.g., five minute intervals) in the power-saving mode. Through these measures, too, position information will be obtained more frequently in the high-precision mode, whereas position information will be obtained less frequently in the power-saving mode, to reduce power consumption in the power-saving mode.

Variation 3

The camera 3 does not need to transmit state information on a regular basis. For instance, as the camera 3 shifts into the active mode, the camera 3 may notify the portable terminal 2 that it has entered the active state and as the camera 3 shifts into the sleep state, the camera 3 may notify the portable terminal 2 that it has entered the sleep state. In other words, whenever the state of the camera 3 shifts, the camera 3 may notify the portable terminal 2 of a shift in its state.

Variation 4

Position information and state information may be transmitted/received through a communication method other than BLE. Position information and state information may instead be transmitted/received through, for instance, communication carried out with sound waves or communication carried out through infrared light transmission. In addition, the portable terminal 2 and the camera 3 may be connected with a wire so as to allow position information and state information to be transmitted/received through wired communication.

Variation 5

The camera 3 may include its own positioning unit, i.e., a positioning unit different from the positioning unit 23 at the portable terminal 2. In such a case, position information may be transmitted from the portable terminal 2 to the camera 3 as in the embodiment described earlier instead of engaging the positioning unit of the camera 3 in a positioning operation, so as to reduce power consumption at the camera 3.

Variation 6

In the embodiments described above, the positioning unit 23 detects position information. However, position information simply represents an example, and the portable terminal 2 may detect information other than position information and transmit the detected information to the camera 3. For instance, a sensor capable of detecting information such as altitude information or water depth information may be installed in the portable terminal 2 and the information detected via the sensor may be transmitted to the camera 3.

Position information, altitude information, water depth information and the like mentioned in this description may be collectively referred to as geographical information the content of which is dependent upon the location where the portable terminal 2 and/or the camera 3 are used.

Variation 7

A program may be provided to the portable terminal 2, the camera 3 or the like described above from a personal computer having the program installed therein through short-distance wireless communication or through infrared communication. In addition, a program may be provided to the personal computer by loading a recording medium such as a CD-ROM with the program stored therein into the personal computer, or by downloading the program into the personal computer through a communication line such as a network. The program to be downloaded into the personal computer via a communication line needs to be stored in a storage device or the like of a server connected to the communication line.

Furthermore, a program may be directly transmitted to the portable terminal 2 or the like via an access point of a wireless LAN connected to a communication line. Moreover, a recording medium such as a memory card with a program stored therein may be set in the portable terminal 2 or the like. Namely, a program can be provided as a computer program product adopting any of various modes, including a computer program product in the form of a recording medium and a computer program product provided via a communication line.

While various embodiments and variations thereof have been described, the present invention is not limited to the particulars of these examples. Any other modes conceivable within the scope of the technical teaching of the present invention are also within the scope of the present invention.

The program described below is also within the scope of the present invention.

(1) A program installed in an electronic device (a mobile device such as a smart phone) having a position information acquiring function, which transmits/receives data to/from an external device (a mobile device, e.g., a digital camera, having a function of generating data such as image data), having a photographing function, and also enables a processor in the electronic device to execute; acquisition processing through which information pertaining to a position (indicating, for instance, a latitude/longitude, an altitude or a water depth) is obtained, first transmission processing through which, after obtaining the information through the acquisition processing, a signal that causes the external device in a first state (e.g., a sleep state) to shift into a second state (e.g., an active state) is transmitted, and second transmission processing through which, following the first transmission processing, the information obtained through the acquisition processing is transmitted to the external device.

The following electronic devices are also within the scope of the present invention.

(1) An electronic device (a mobile device such as a smart phone), comprising a setting unit that sets either a first mode (a mode in which information related to a position is obtained with, for instance, high precision) or a second mode (a mode in which information is obtained while, for instance, using less power), an acquisition unit that obtains, via a sensor, information related to a position, an altitude, a water depth or the like, and a transmission unit that transmits, to an external device (a mobile device, e.g., a digital camera having a function of generating data such as image data) either in a first state (e.g., a sleep state or a non-screen display state) in which information reception is disabled or in a second state (e.g., an active state or a screen display state) in which information reception is enabled, a signal that causes the external device to shift from the first state to the second state and also transmits the information obtained by the acquisition unit, based upon the selected mode and the state of the external device.

(2) An electronic device (a mobile device, e.g., a digital camera, having a function of generating data such as image data), comprising a generation unit that generates data (e.g., image data), a reception unit that receives information related to a position from an external device (a mobile device such as a smart phone) and a control unit that correlates the data generated by the generation unit with the information related to a position received by the reception unit after generation of the data by the generation unit.

(3) An electronic device (a mobile device, e.g., a digital camera, having a function of generating data such as image data), comprising a generation unit that generates data (e.g., image data), a reception unit that receives information related to a position from an external device (a mobile device such as a smart phone), a storage unit in which the information related to a position received by the reception unit is stored, and a control unit that correlates the data generated by the generation unit with the information related to the position information stored in the storage unit. If the information related to the position stored in the storage unit was received by the reception unit prior to a time point at which power has been turned on most recently, i.e., prior to a power on time point closest to the generation of the data, the control unit does not correlate the data generated by the generation unit with the information related to a position stored in the storage unit.

(4) An electronic device (a mobile device, e.g., a digital camera, having a function of generating data such as image data), comprising a generation unit that generates data (e.g., image data), a reception unit that receives information related to a position from an external device (a mobile device such as a smart phone), a storage unit in which the information related to a position received by the reception unit is stored, and a control unit that correlates the data generated by the generation unit with the information related to a position stored in the storage unit. If a predetermined length of time has elapsed since a time point at which the information related to a position stored in the storage unit was received by the reception unit, the control unit does not correlate the data generated by the generation unit with the information related to the position stored in the storage unit.

The disclosure of the following priority application is herein incorporated by reference: Japanese Patent Application No. 2017-214074 filed Nov. 6, 2017

REFERENCE SIGNS LIST

1 . . . INFORMATION COMMUNICATION SYSTEM, 2 . . . PORTABLE TERMINAL, 3 . . . CAMERA, 21 . . . CONTROL UNIT, 22 . . . OPERATION UNIT, 23 . . . POSITIONING UNIT, 24 . . . WIDE-AREA COMMUNICATION UNIT, 25 . . . SHORT-DISTANCE COMMUNICATION UNIT, 31 . . . IMAGE-CAPTURING OPTICAL SYSTEM, 32 . . . IMAGE SENSOR, 33 . . . CAMERA CONTROL UNIT, 34 . . . CAMERA COMMUNICATION UNIT, 35 . . . STORAGE UNIT, 36 . . . CAMERA OPERATION UNIT, 37 . . . DISPLAY UNIT

The invention claimed is:

1. An electronic device comprising:
a generation unit that generates data;
a reception unit that receives, from an external device, information related to a position, the information including first information and second information;
a storage unit that stores the first information and the second information related to the position received by the reception unit; and
a control unit that
correlates the data generated by the generation unit with the first information related to the position or the second information related to the position stored in the storage unit, wherein
the first information is obtained by the electronic device transmitting a request, to the external device, to transmit the first information,
the second information is obtained without the electronic device transmitting the request to the external device, and
the control unit determines an elapsed length of time that has passed since the reception unit received the information that is currently stored in the storage unit by comparing a current time point with a time point at which the first information or the second information related to the position that is currently stored in the storage unit was stored in the storage unit, and
in response to the elapsed length of time being greater than or equal to a predetermined length of time, transmits the request, to the external device, to transmit the first information related to the position, and correlates the data generated by the generation unit with the first information related to the position received by the reception unit after transmission of the request.

2. The electronic device according to claim 1, wherein the control unit
attaches to the generated data, the first information received by the reception unit received after transmission of the request, and stores the generated data with the attached first information in the storage unit.

3. The electronic device according to claim 1, wherein:
the control unit causes the electronic device to change from a third state to a first state based on a signal received from the external device.

4. The electronic device according to claim 3, wherein:
the third state consumes less power than the first state.

5. The electronic device according to claim 3, wherein:
the first state is a state in which an image is displayed on a display unit of the electronic device, and the third state is a state in which no image is displayed on the display unit.

6. An electronic device comprising:
a generation unit that generates data;
a reception unit that receives, from an external device, information related to a position, the information including first information and second information;
a storage unit that stores the first information and the second information related to the position received from the reception unit; and
a control unit that
correlates the data generated by the generation unit with the first information related to the position or the second information related to the position stored in the storage unit, wherein
the first information is obtained by the electronic device transmitting a request, to the external device, to transmit the first information,
the second information is obtained without the electronic device transmitting the request to the external device, and
the control unit determines whether the reception unit received the information that is currently stored in the storage unit after a time when the electronic device entered a first state from a second state by comparing the time at which the electronic device entered the first state from the second state with a time point at which the first information or the second information related to the position that is currently stored in the storage unit was stored in the storage unit, and
when the first information or the second information related to the position that is stored in the storage unit was received by the reception unit prior to the time at which the electronic device entered the first state from the second state, transmits the request, to the external device, to transmit the first information related to the position, and correlates the data generated by the generation unit with the first information related to the position received by the reception unit after transmission of the request.

7. The electronic device according to claim 6, wherein the control unit
attaches to the generated data, the first information received by the reception unit received after transmission of the request, and
stores the generated data with the attached first information in the storage unit.

8. The electronic device according to claim 6, wherein:
the control unit causes the electronic device to change from a third state to the first state based on a signal received from the external device.

9. The electronic device according to claim 8, wherein:
the third state consumes less power than the first state.

10. The electronic device according to claim 8, wherein:
the first state is a state in which an image is displayed on a display unit of the electronic device, and the third state is a state in which no image is displayed on the display unit.

11. The electronic device according to claim 6, wherein the second state is a power-off state.

12. An electronic device comprising:
a generation unit that generates data;
a reception unit that receives, from an external device, information related to a position, the information including first information and second information;
a storage unit that stores the first information and the second information related to the position received from the reception unit; and
a control unit that
correlates the data generated by the generation unit with the first information related to the position or the second information related to the position stored in the storage unit, wherein
the first information is obtained by the electronic device transmitting a request, to the external device, to transmit the first information,
the second information is obtained without the electronic device transmitting the request to the external device, and
the control unit transmits the request, to the external device, to transmit the first information related to the position, and correlates the data generated by the generation unit with the first information related to the position received by the reception unit after transmission of the request, depending on whether the second information was received after the electronic device entered a first state from a second state.

13. The electronic device according to claim 12, wherein the control unit
attaches to the generated data, the first information received by the reception unit received after transmission of the request, and
stores the generated data with the attached first information in the storage unit.

14. The electronic device according to claim 12, wherein:
the control unit causes the electronic device to change from a third state to the first state based on a signal received from the external device.

15. The electronic device according to claim 14, wherein:
the third state consumes less power than the first state.

16. The electronic device according to claim 14, wherein:
the first state is a state in which an image is displayed on a display unit of the electronic device, and the third state is a state in which no image is displayed on the display unit.

17. The electronic device according to claim 12, wherein the second state is a power-off state.

* * * * *